No. 610,546. Patented Sept. 13, 1898.
G. LEWIS.
CULTIVATOR.
(Application filed Nov. 24, 1897.)
(No Model.) 2 Sheets—Sheet 1.
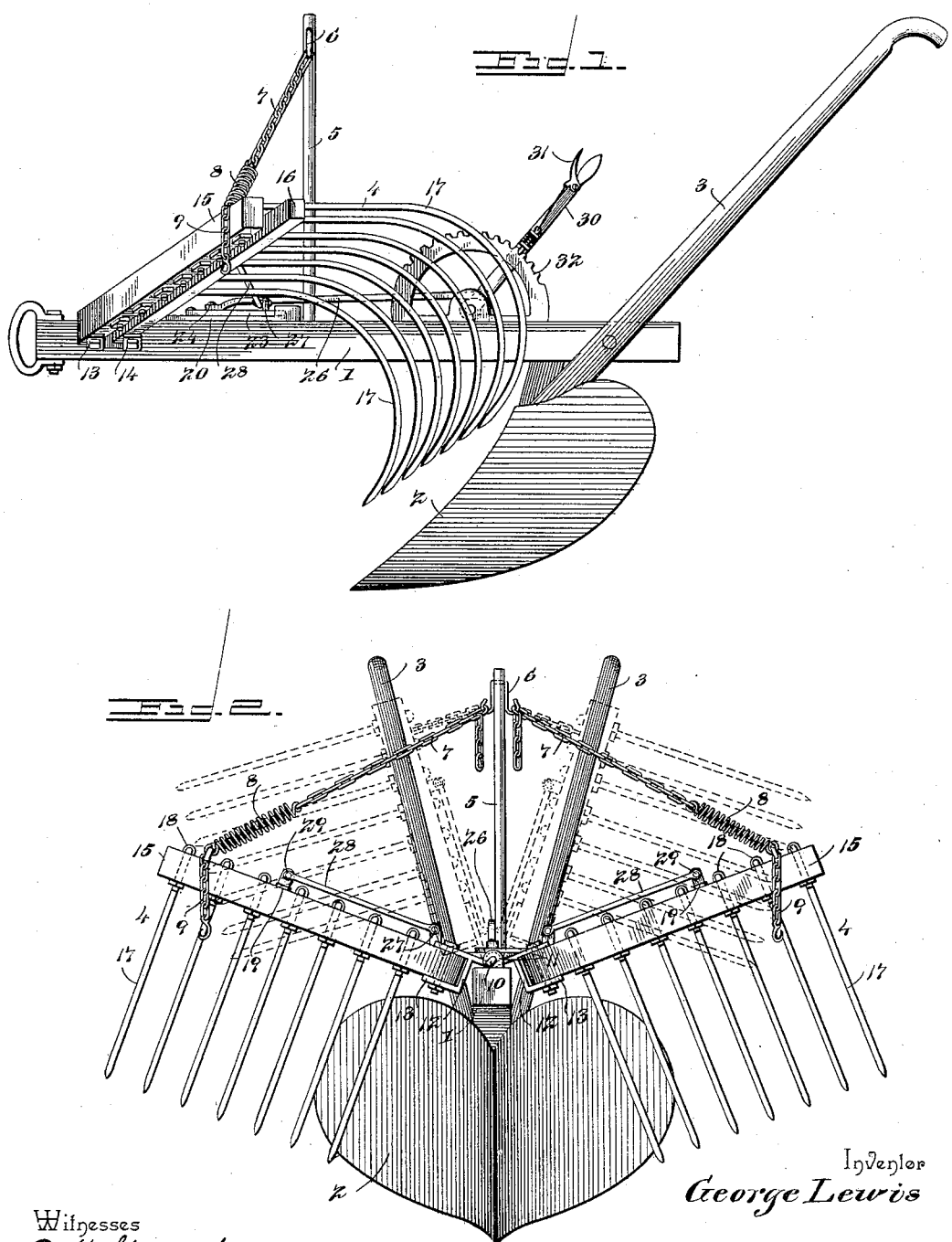
Witnesses
E. K. Stewart.
U. B. Hillyard.
Inventor
George Lewis
By his Attorneys,
C. A. Snow & Co.

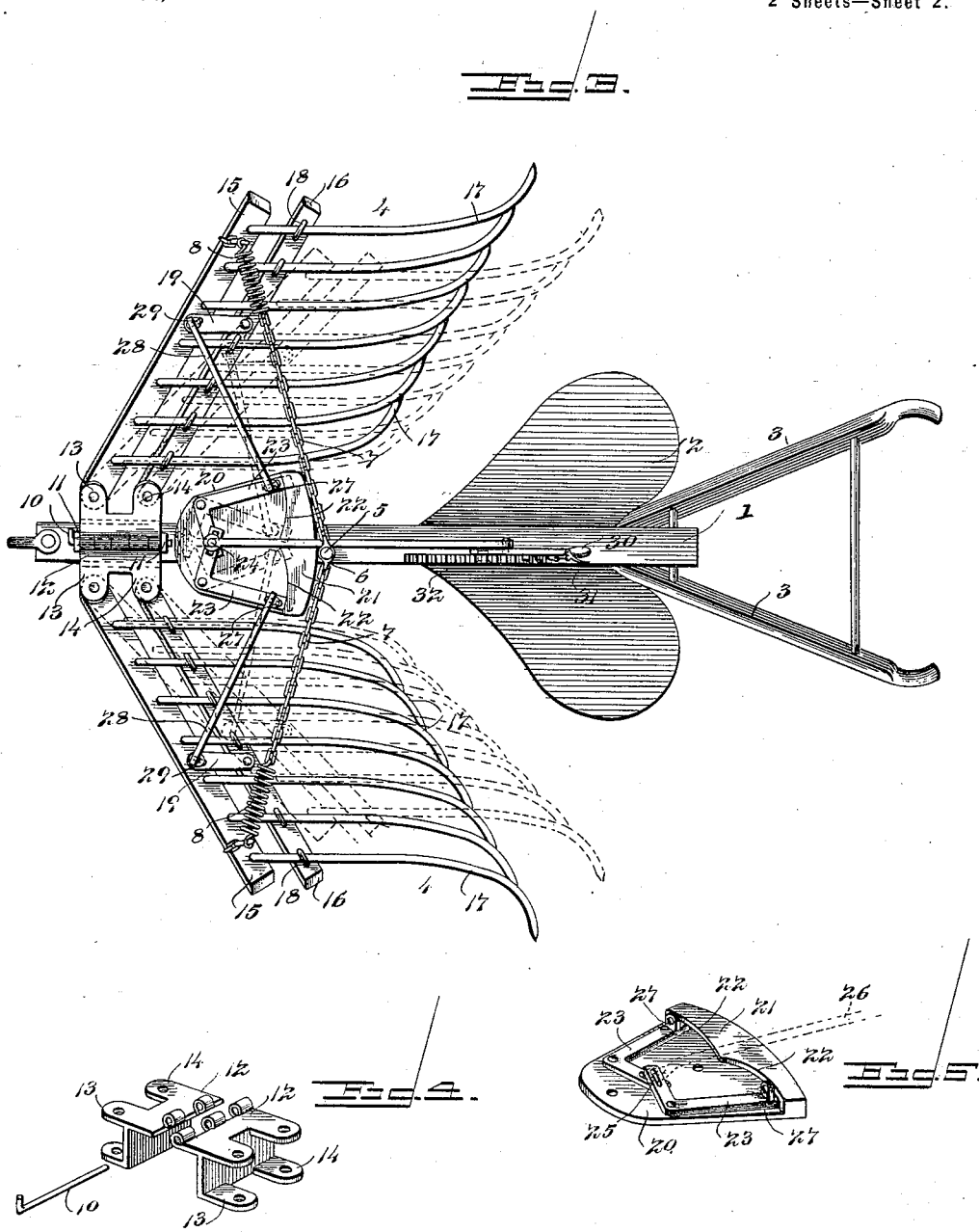

UNITED STATES PATENT OFFICE.

GEORGE LEWIS, OF COBDEN, ILLINOIS, ASSIGNOR OF TWO-THIRDS TO JOHN B. B. BROADWAY AND DAVID A. SMITH, OF SAME PLACE.

CULTIVATOR.

SPECIFICATION forming part of Letters Patent No. 610,546, dated September 13, 1898.

Application filed November 24, 1897. Serial No. 659,699. (No model.)

*To all whom it may concern:*

Be it known that I, GEORGE LEWIS, a citizen of the United States, residing at Cobden, in the county of Union and State of Illinois, have invented a new and useful Cultivator, of which the following is a specification.

This invention relates to implements for cultivating potatoes, which in order to secure the best crop require cultivation and a moving or turning of the vines in order to prevent the formation of small potatoes in the spaces between the rows, which take from the strength of the main crop in the hills.

The purpose of this invention is to provide an implement which will cultivate and at the same time shift or turn the vines, thereby reducing labor and the attendant cost and increasing the chances for a plentiful crop.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a side elevation of a cultivator constructed in accordance with this invention. Fig. 2 is a front view thereof, the dotted lines showing the position of the rakes when turned up out of the way. Fig. 3 is a top plan view, the dotted lines showing the rakes adjusted to adapt them to the distance between the rows. Fig. 4 is a detail view in perspective of the hinge connection between the rakes and the beam. Fig. 5 is a detail view in perspective of the elbow-levers for adjusting the spread of the rakes and the plate to which the said levers are fulcrumed.

Corresponding and like parts are referred to in the following description and indicated in the several views of the accompanying drawings by the same reference characters.

The implement comprises a beam 1, a plow-point or shovel 2, handles 3, and rakes 4, the latter being hinged or loosely connected at their inner ends to the front end of the beam, so as to be turned up out of the way and moved to adapt them to the distance between the rows to be cultivated.

A standard 5 is secured at its lower end to the beam and is provided at its upper end with a double hook 6, to which chains 7 are adjustably connected, so as to hold the outer ends of the rakes at the required elevation. Springs 8 are interposed in the length of the chains 7 to admit of the outer ends of the rakes adapting themselves to the surface condition of the ground over which the implement is advancing. The springs 8 have direct connection at their lower ends with the rake-heads, and their upper ends are made fast to the lower ends of the chains 7. Short chains 9 are secured to the outer ends of the rake-heads and are adapted to make engagement with the hooks 6, so as to hold the rakes up out of the way when not required for service, as indicated by the dotted lines in Fig. 2.

A rod or pin 10 is secured at its ends in stub-posts 11, applied to the upper side of the beam 1, and extends through knuckles provided at the inner edges of plates 12, whereby the latter are hinged together and to the beam. Each of the plates is formed with pairs of ears 13 and 14, the inner ends of the rake-heads 15 being pivoted between the ears 13 and bars 16 being pivoted at their inner ends between the ears 14, whereby the rake-heads and bars are adapted to turn about axes at right angles to the axis of the plates 12. The rake-heads and bars 16 extend parallel and support tines 17, which constitute the rake-teeth, said tines having their front ends bent and journaled in the rake-heads and having their front portions passing through staples or keepers 18, applied to the bars 16, whereby the said tines are held a fixed distance apart and are strengthened and braced. Links 19, pivoted at their ends to the rake-heads and bars, hold the latter apart at their outer ends.

A plate 20 is secured to the top side of the beam 1 and projects beyond the sides thereof and has a cap-plate 21 applied to its rear end and curving in opposite directions at its front edge, as shown at 22. Elbow-levers 23 are pivoted at the elbow to the front end of the plate 20, near its outer edge, and their transverse arms extend inward and overlap, a pin 24, applied to the lower arm, projecting through a slot 25 in the upper arm and having connection with a rod 26, by means of which the levers are operated to adjust the rakes when required. The longitudinal arms of the elbow-levers have their rear ends operating in the space formed between the plates 20 and 21 and are prevented from vertical movement thereby, and have studs 27, to which the inner ends of rods 28 are pivoted, the outer ends of said rods having pivotal connection with pins or bolts 29, applied to the rake-heads near their outer ends. The studs 27 are adapted to engage with the curved edges 22 of the cap-plate and are braced thereby, so as to relieve in a measure the pivots of the elbow-levers from the strain. The rear end of the rod 26 has pivotal connection with an operating-lever 30, which latter is provided with a hand-latch 31 to operate in connection with a notched segment 32 to hold the rakes in an adjusted position.

The outer ends of the rakes may be adjusted to the required elevation and have their position fixed by connecting the chains 7 with the end portions of the double hook 6, and the spread of the rakes is controlled by operating the lever 30, as will be readily understood. When it is not required to use the rakes, they may be turned up out of the way and the short chains 9 engaged with the double hook 6, as indicated. As the cultivator is drawn over the field between the hills or rows of potatoes the rakes move the vines and loosen the soil and the plow-point or shovel 2 opens the land, thereby completing the cultivation.

The construction herein provides for cultivating two half-rows, and when it is required to cultivate a single row the beams will be duplicated and rakes applied thereto, so as to straddle the row, a horse being hitched to each beam and walking between the middle and the adjacent rows.

Having thus described the invention, what is claimed as new is—

1. In an implement of the variety specified, the combination of a longitudinal beam, parallel bars spaced apart and arranged the one in advance of the other in substantially the same horizontal plane and pivotally connected with the beam to swing horizontally, rake-teeth having pivotal connection with one of the bars in a direction at right angles to the horizontal movement of said bars, and keepers applied to the other bar and confining the rake-teeth thereto and admitting of them having a sliding movement with reference to the said bars, substantially as set forth.

2. In an implement of the character described, the combination of a longitudinal beam, parallel bars spaced apart and disposed the one in advance of the other and having pivotal connection with the said beam to swing horizontally, a connection between the pivoted bars to cause them to move in unison at their outer ends, rake-teeth pivoted vertically at their front ends to the forward pivoted bar, and keepers confining the rake-teeth to the rear pivoted bar and admitting of them having a sliding movement with reference thereto when swinging the bars upon their pivots, substantially as and for the purpose set forth.

3. In an implement for the purpose set forth, the combination of a beam, a plate pivotally connected with the beam and adapted to swing vertically, bars arranged the one in advance of the other and spaced apart and having pivotal connection with said plate to swing horizontally, a link connecting the pivoted bars to cause them to move in unison and disposed parallel with the aforesaid beam, rake-teeth having pivotal connection with the forward pivoted bar, and keepers confining the rake-teeth to the rear pivoted bar and admitting of said teeth having a sliding movement with reference thereto, substantially as described.

4. In combination, a beam, a rake-head having loose connection with the beam, an elbow-lever, a rod connecting an arm of the lever with the rake-head, and an operating-lever having connection with the opposite arm of the elbow-lever, substantially as set forth.

5. In a cultivator or the like, the combination of a beam, an operative member having loose connection therewith, a plate, an elbow-lever pivoted upon said plate, connections between one arm of the elbow-lever and the operative member for moving the latter from the former, means under the control of the operator for throwing the other arm of the lever, and a cap-plate overlapping one of the lever-arms and forming a guide therefor; substantially as described.

6. In a cultivator, the combination of a beam, a rake having loose connection therewith, a plate, an elbow-shaped lever fulcrumed to the plate and having its longitudinal arm in connection with the rake, an operating-lever having connection with the transverse arm of the elbow-lever, and a cap-plate secured to the aforesaid plate and overlapping the rear end of the elbow-lever, substantially as set forth.

7. In combination, a beam, rakes hinged to opposite sides of the beam, means for adjusting the outer ends of the rakes vertically, elbow-shaped levers having their horizontal arms in connection with the rakes, and an operating-lever having connection with the transverse arms of the elbow-levers for adjusting the free ends of the rakes in and out, substantially as described.

8. In a cultivator or the like, a beam, a plate hinged to the beam and having pairs of ears, a rake-head pivoted in one pair of ears, a bar pivoted in the other pair of ears, means for causing the head and the bar to swing upon their pivots in unison, guides upon the bar, tines pivoted to the rake-head and resting in the guides, means for swinging the plate vertically upon its hinge, and means for swinging the rake-head and the bar upon their pivots; substantially as described.

9. In combination, a beam, plates hinged to the beam and provided with pairs of ears, rake-heads and parallel bars pivoted to the said ears, tines passing through keepers of the bars and journaled at their front ends to the rake-heads, elbow-shaped levers having connection with the rake-heads for adjusting them laterally, means for operating the elbow-levers and securing them in an adjusted position, a standard rising from the beam, and connections between the rake-heads and standard for holding the outer ends of the rakes at any required elevation, substantially as set forth.

In testimony that I claim the foregoing as my own I have hereto affixed my signature in the presence of two witnesses.

GEO. LEWIS.

Witnesses:
J. M. DAWSON,
O. E. BALDWIN.